(No Model.)
J. S. SHERMAN.
DEVICE FOR REMOVING DUST, &c., FROM HAY DURING THE PROCESS OF BALING.
No. 313,960. Patented Mar. 17, 1885.
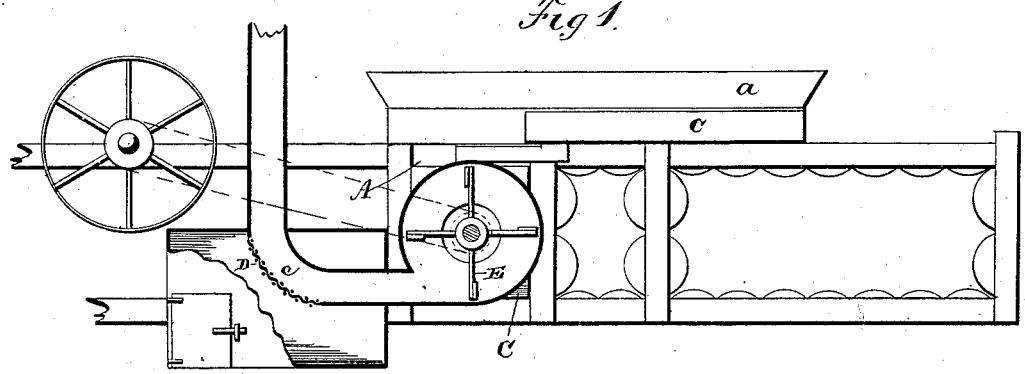
Fig. 1.
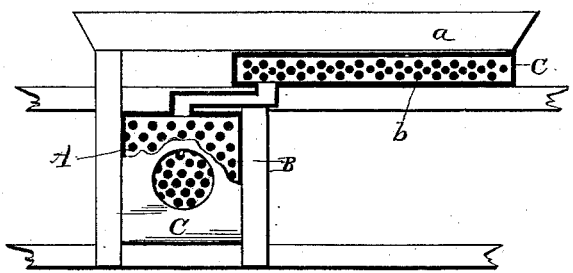
Fig. 2.
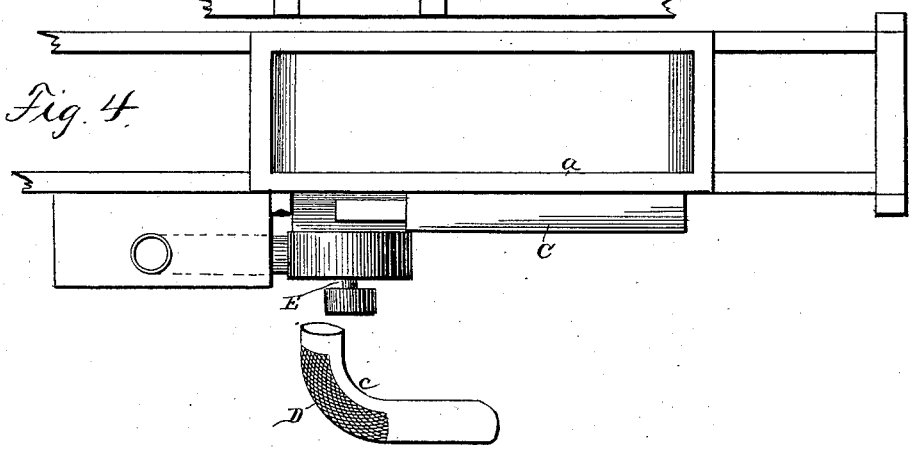
Fig. 4.
Fig. 3.
WITNESSES
Geo. F. Downing.
W. H. Ruff.
INVENTOR
Jacob S. Sherman,
By H. A. Symons,
Attorney.

UNITED STATES PATENT OFFICE.

JACOB S. SHERMAN, OF CASSOPOLIS, MICHIGAN.

DEVICE FOR REMOVING DUST, &c., FROM HAY DURING THE PROCESS OF BALING.

SPECIFICATION forming part of Letters Patent No. 313,960, dated March 17, 1885.

Application filed January 21, 1885. (No model.)

*To all whom it may concern:*

Be it known that I, JACOB S. SHERMAN, of Cassopolis, in the county of Cass and State of Michigan, have invented certain new and useful Improvements in Devices for Removing the Dust, Chaff, Loose Seed, &c., from Hay During the Process of Baling; and I do hereby declare the following to be a full, clear, and exact description of the invention, such as will enable others skilled in the art to which it appertains to make and use the same.

My invention relates to an improvement in devices for removing dust, chaff, loose seed, &c., from hay during the process of baling.
There exists in hay and straw a greater or lesser amount of dust, chaff, and loose seed. The "dust," as it is commonly termed, consists to a great extent of pollen from the blow, ergot or smut, and a fine down consisting of small needle-like particles which grow on the stalk, and are particularly abundant on clover-stalks, growing on mammoth clover to the length of one-eighth of an inch. This dust when breathed by horses produces a stinging or smarting sensation upon the more tender parts of the nostrils, throat, and lungs, the immediate effect of which is to cause the horse to cough and sneeze, but the more remote effect is to derange the lungs and breathing apparatus.

The object of my present invention is to provide a device for improving the quality of hay by removing therefrom the dust, chaff, &c., a further object being to provide a device for removing the dust, chaff, and loose seed which shall at the same time force the hay or straw into the packing-chamber; and with these ends in view my invention consists in an exhaust-chamber communicating with one or both of the receiving-chambers of a hay-press, and means for exhausting the air from said chamber.

My invention further consists in certain features of construction and combinations of parts, as will be hereinafter described, and pointed out in the claims.

In the accompanying drawings, Figure 1 is a view of a portion of a hay-press with the dust-removing device attached. Fig. 2 is a detached view of the exhaust-chamber, seed-receptacle, and exhaust-fans; and Fig. 3 is a view of the elbow-screen in the dust-conduit. Fig. 4 is a plan view.

A and *a* represent the lower and upper packing or receiving chambers of a hay-press. The press here shown is a portable press of the perpetual type. The press itself, however, in its general construction forms no part of my present invention, and is introduced only for the purpose of showing the practical application of my dust-removing device. The chambers A *a* are supposed to be closed, excepting at the top or the mouth, which receives the hay, and at the points where the exhaust chamber or chambers communicate therewith. The sides of the chambers A and *a*, one or both, preferably both, are perforated, as shown at B *b*, the said perforated portions being incased by a dust-conduit, C, one end of which is secured snugly to the chamber about the perforated portion, and the other extends to a suitable distance above, below, or from the side of the press. A short distance from the press the conduits C are bent, forming elbows *c*, on the convex side of which a screen, D, is inserted, for the purpose of abruptly stopping the heavier portions of the chaff and seed in their progress through the conduit, and allowing the seed to pass through its meshes. The elbow portion of the conduit is surrounded by an air-tight box, which receives the seed as it falls from the screen.

E represents a set of exhaust-fans adapted to exhaust the air from the receiving-chambers A and *a*, and thereby produce a continuous draft of air downwardly through the hay or straw in the receiving-chambers, and thence outwardly through the conduit C. The strong draft thus formed will draw the dust, chaff, and loose seed which are free or set free during the baling process from the hay, and out through the exhaust-chamber, and will at the same time draw the hay or straw into the receiving-chambers. When the upper chamber, *a*, is closed, the draft will be through the lower chamber, A, and when the lower chamber is closed, through the upper chamber, *a*. The exhaust-chamber and dust-conduit may be connected with one side of each chamber, being provided with branches at its end for this purpose; or a single air-tight box may be constructed to inclose the perforations in the upper and lower chambers on the same side, and the exhaust-pipe be connected therewith, or the exhaust-pipes may connect with both sides of the lower and upper chambers; or other means than the exhaust-fan shown might also be employed to produce the draft; hence I do not wish to limit myself strictly to the construction herein set forth, but reserve the privilege of making such changes as fairly fall within the spirit and scope of my invention.

Having fully described my invention, what I claim as new, and desire to secure by Letters Patent, is—

1. The combination, with a hay-press, of an exhaust-chamber communicating therewith, and means of exhausting the air therefrom, for the purpose substantially as set forth.

2. The combination, with a hay-press having a receiving-chamber open at the mouth only, of a dust-conduit communicating with the chamber, and means for exhausting the air from said conduit, thereby producing a draft through the receiving-chamber and conduit, substantially as set forth.

3. The combination, with the receiving chamber or chambers of a hay-press, of an exhaust-pipe and dust-conduit communicating therewith, having a bent portion provided with a screen, for the purpose substantially as set forth.

4. The combination, with a receiving-chamber of a hay-press, of an exhaust-pipe and dust-conduit communicating therewith, a screen connecting with the conduit, and a seed-receptacle inclosing the screen portion of the conduit, substantially as set forth.

In testimony whereof I have signed this specification in the presence of two subscribing witnesses.

JACOB S. SHERMAN.

Witnesses:
O. E. WOODS,
WM. M. BUNBURY.